March 10, 1964  C. E. WADE, JR  3,123,960
APPARATUS FOR PREPARING FILLED CARTONS FOR MERCHANDISING
Original Filed Sept. 1, 1959  7 Sheets-Sheet 5
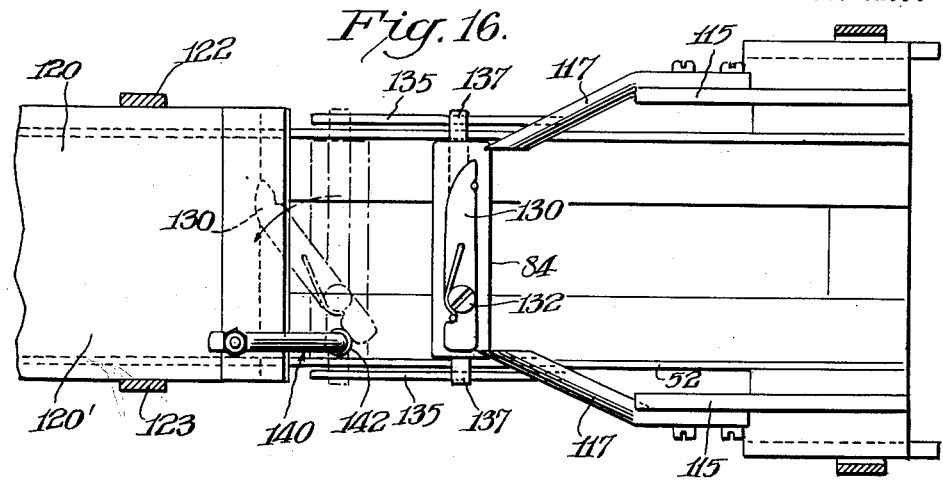
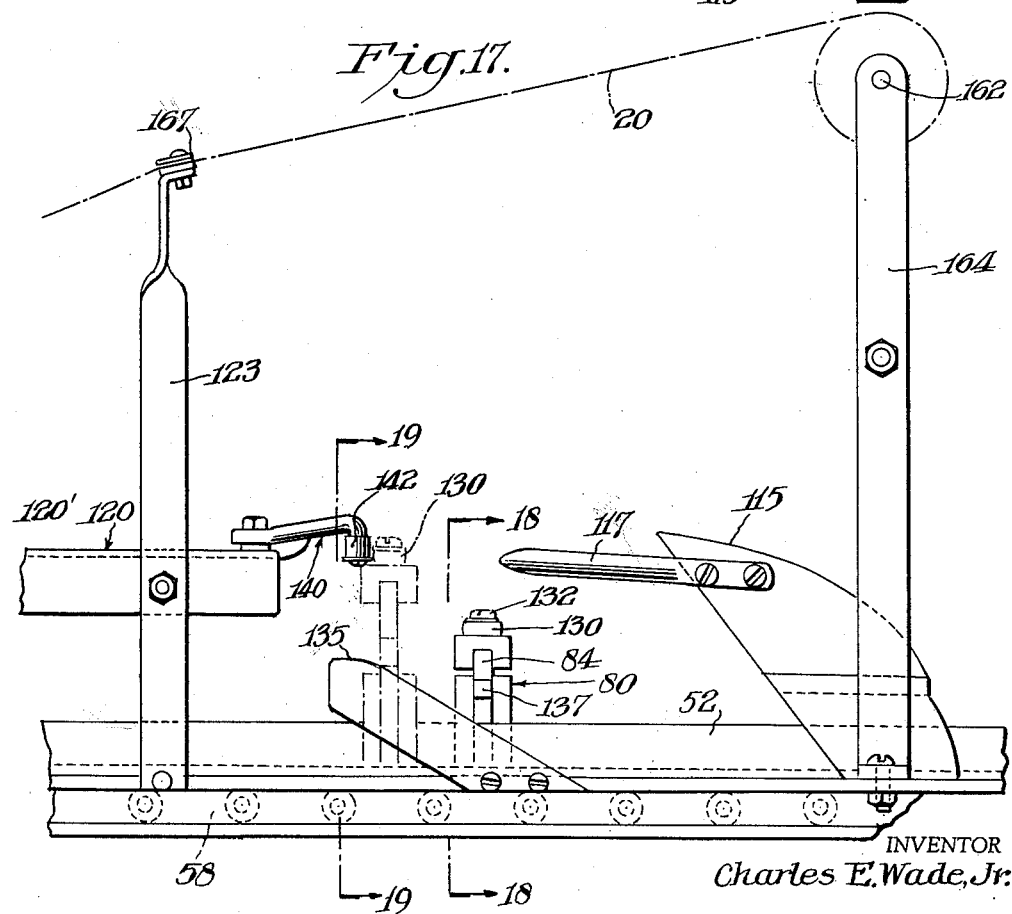
INVENTOR
Charles E. Wade, Jr.
BY Connolly and Hutz
ATTORNEYS March 10, 1964 C. E. WADE, JR 3,123,960
APPARATUS FOR PREPARING FILLED CARTONS FOR MERCHANDISING
Original Filed Sept. 1, 1959                    7 Sheets-Sheet 6
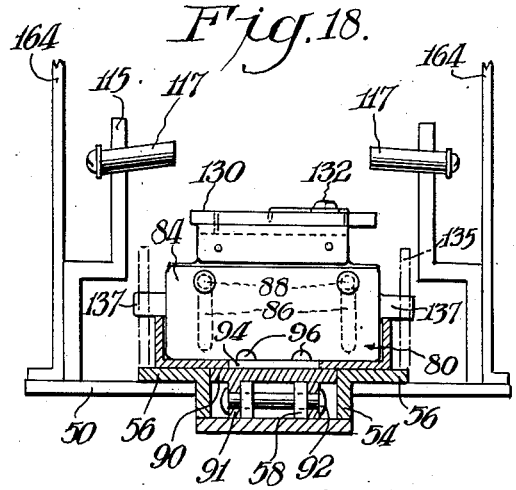
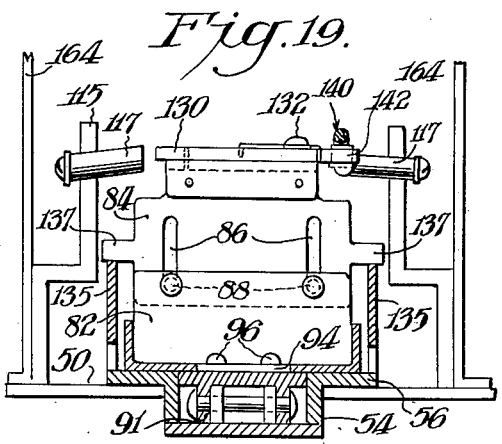
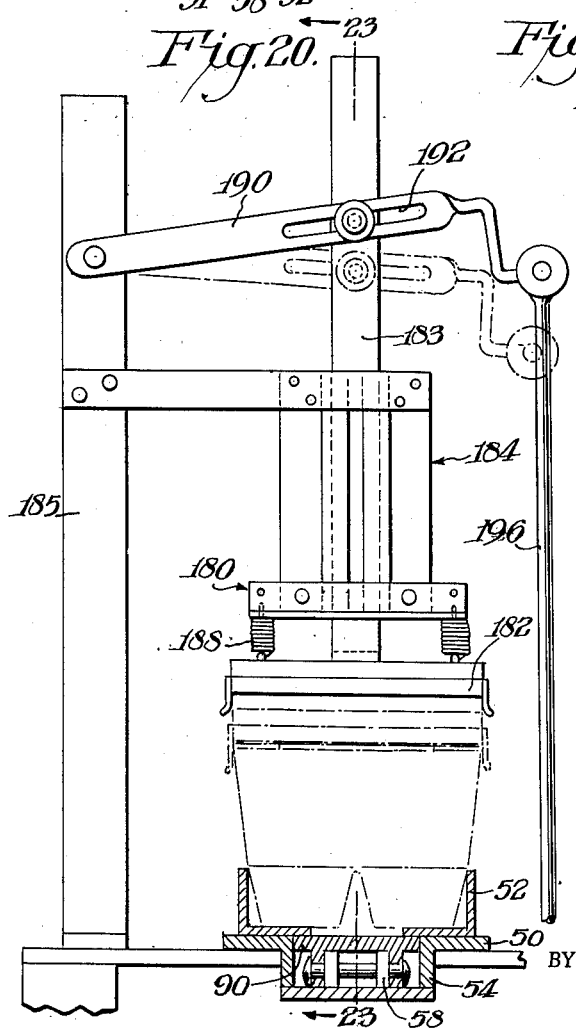
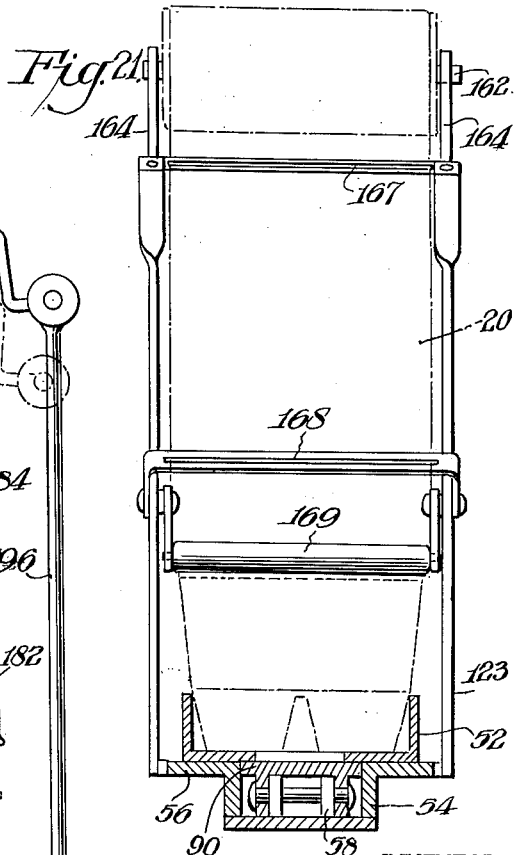
INVENTOR:
Charles E. Wade, Jr.
BY Connolly and Hutz
ATTORNEYS

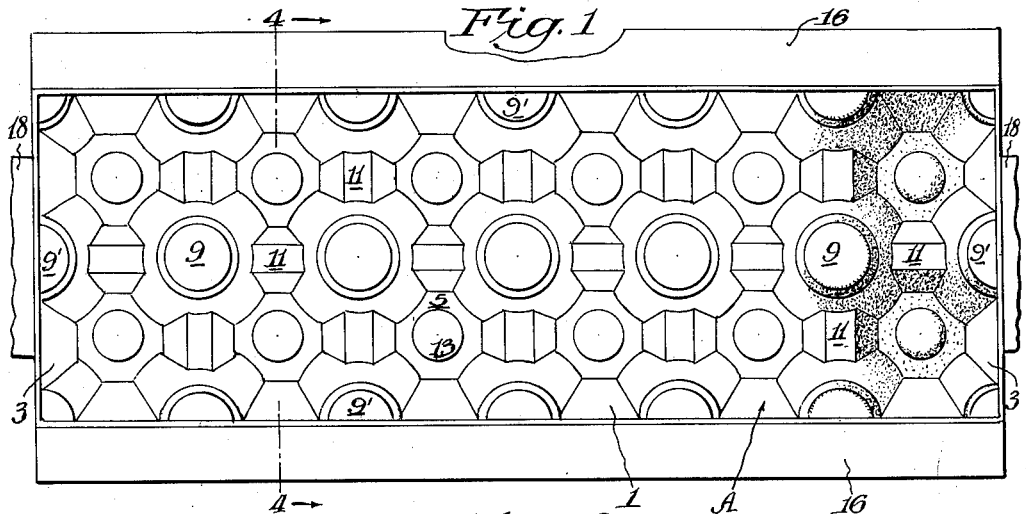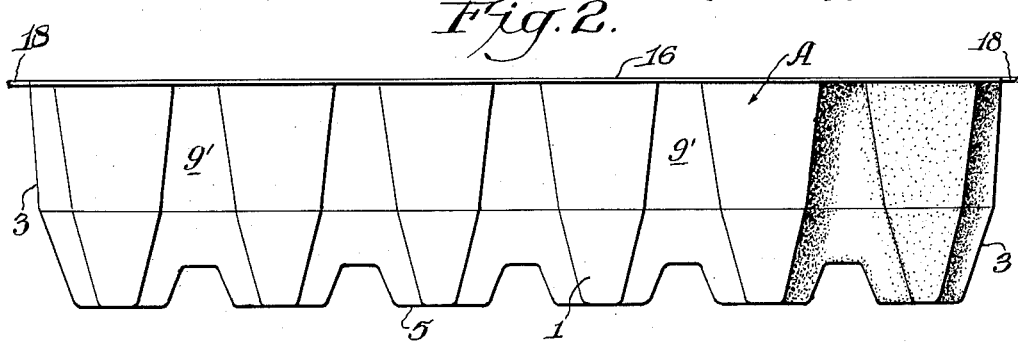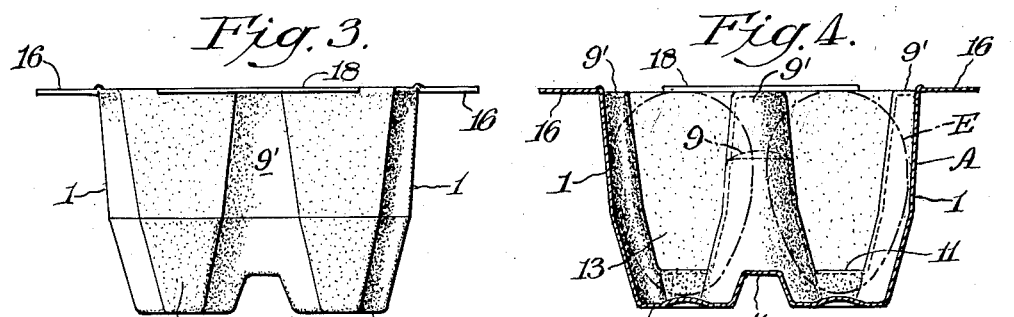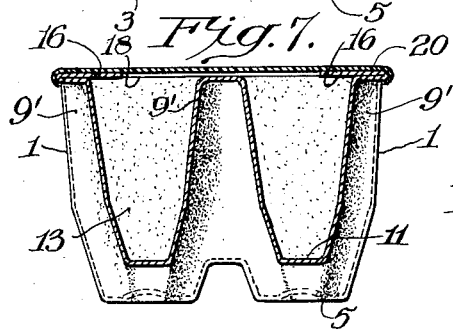

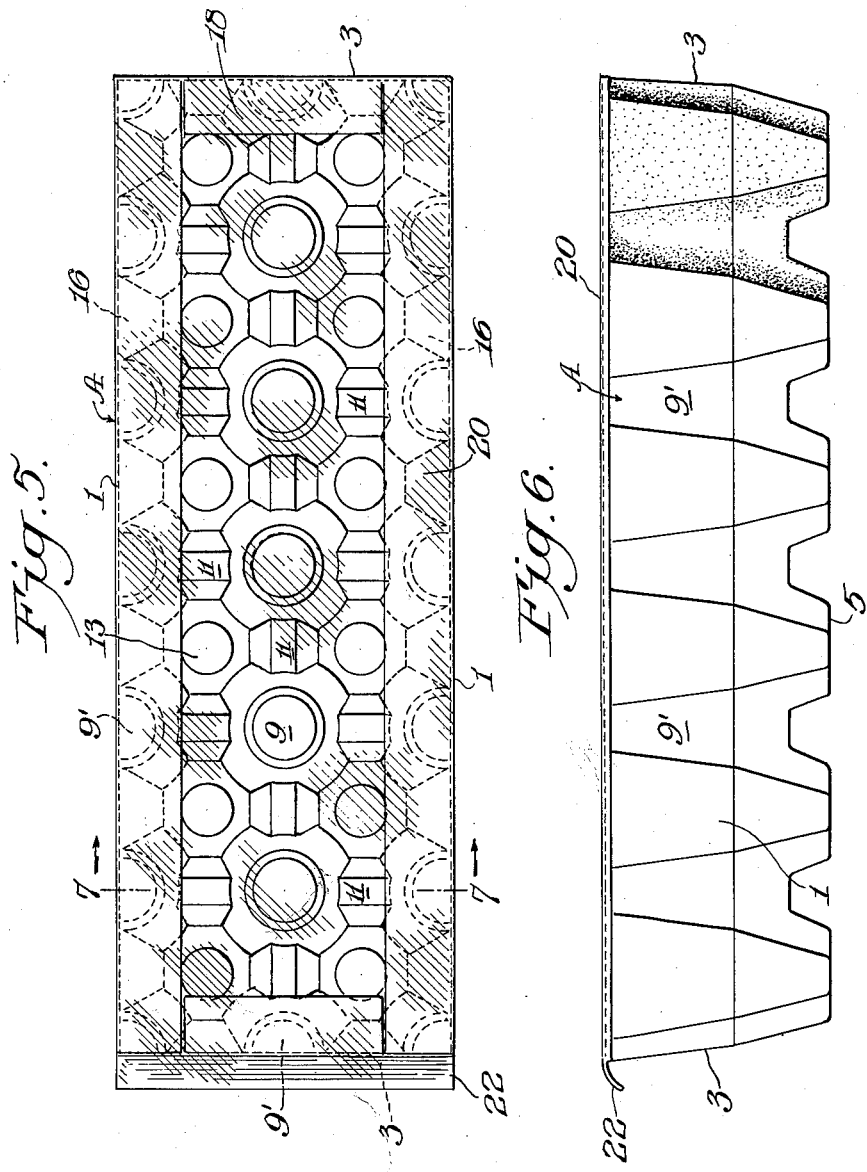

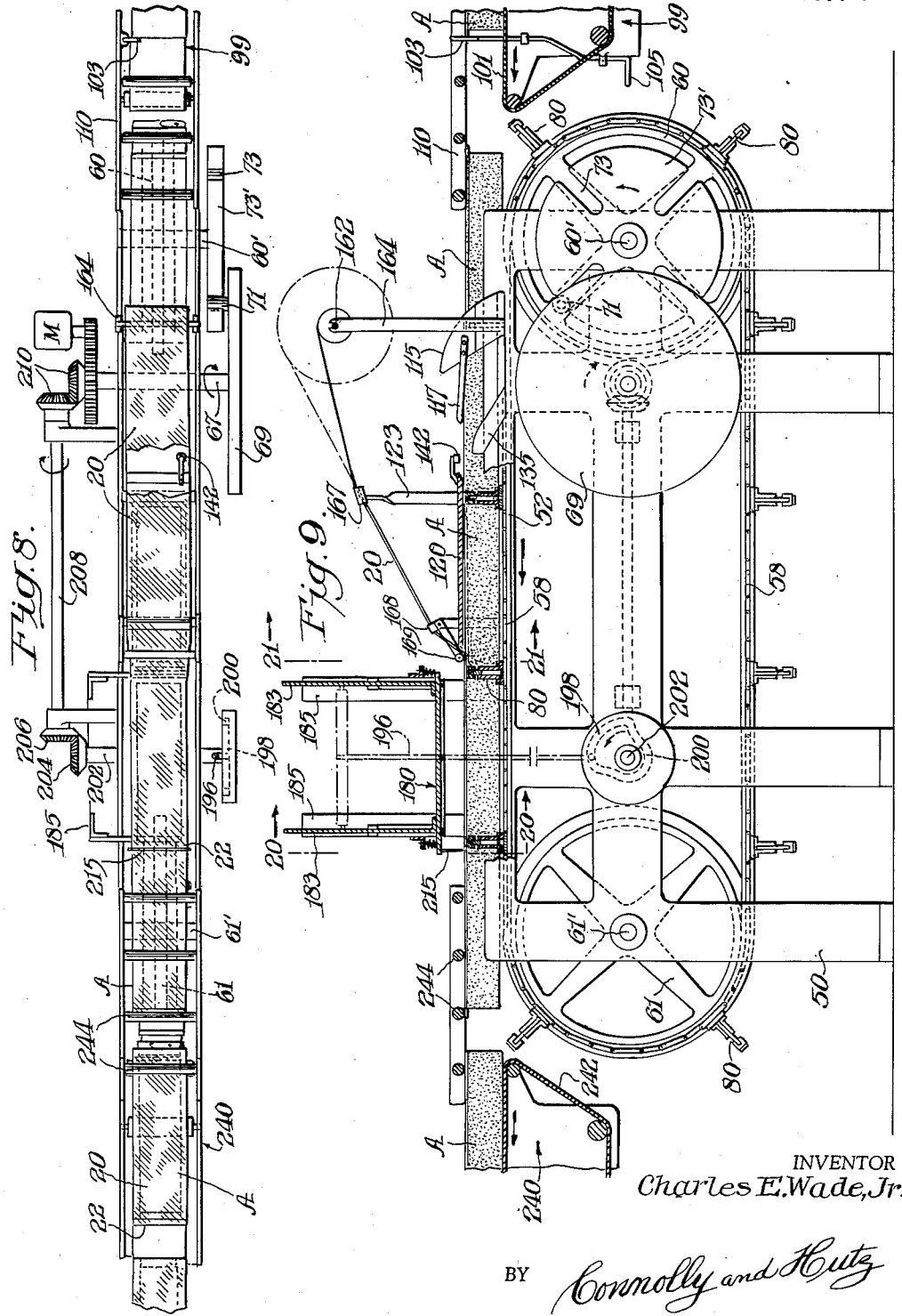

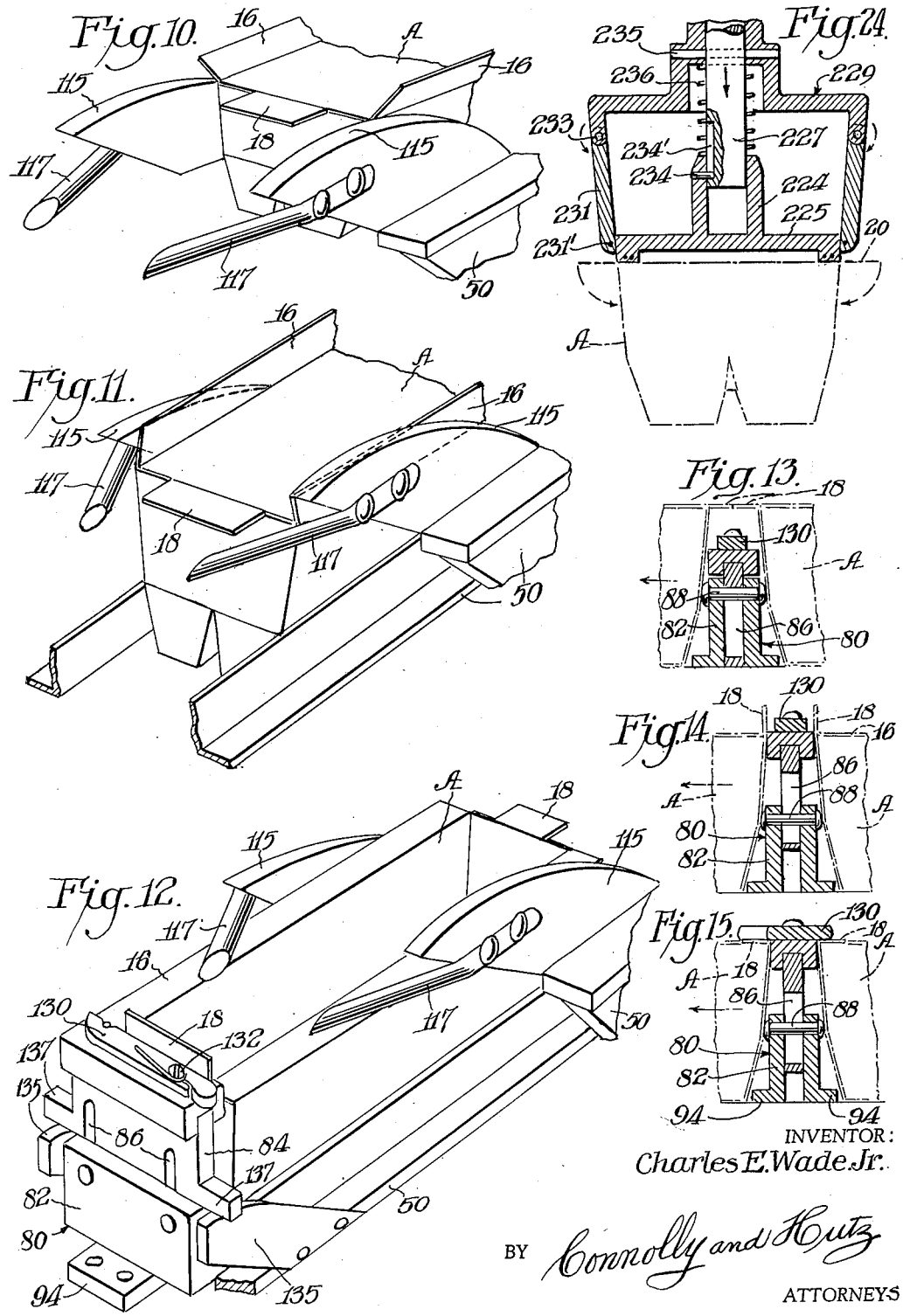

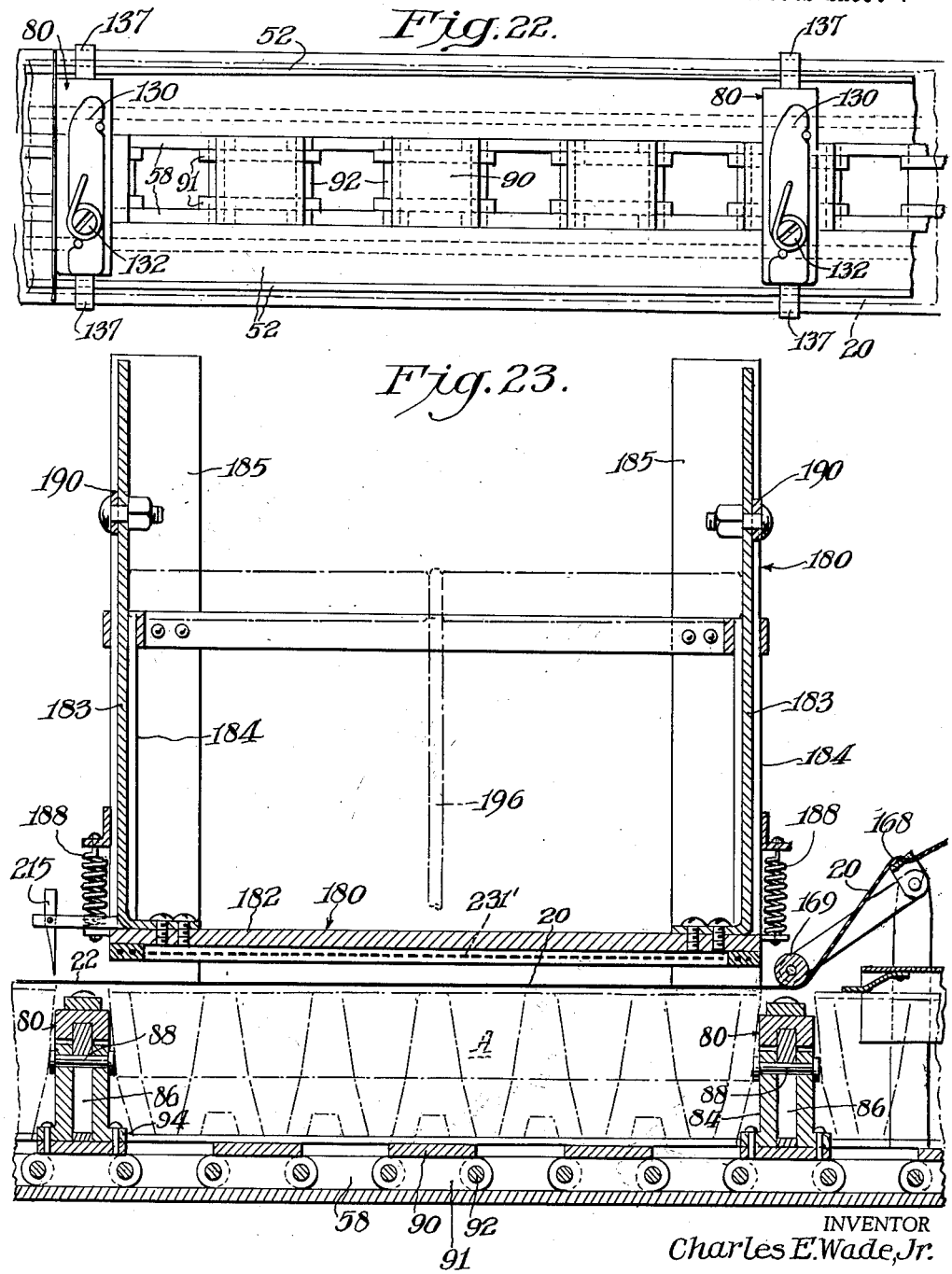

United States Patent Office
3,123,960
Patented Mar. 10, 1964

3,123,960
APPARATUS FOR PREPARING FILLED CARTONS FOR MERCHANDISING
Charles E. Wade, Jr., Roanoke, Va.
(P.O. Box 90, Morristown, N.J.)
Original application Sept. 1, 1959, Ser. No. 837,510. Divided and this application May 10, 1961, Ser. No. 118,752
2 Claims. (Cl. 53—376)

The present invention relates to a novel and improved method and apparatus for preparing egg filled cartons for merchandizing.

Generally, eggs from the farm are delivered to a candling, sizing and packaging center where the eggs are packaged in cartons which contain one dozen eggs. The cartons are then crated in crates which hold thirty dozen eggs. After being crated, the eggs are then shipped to the retailer who places the individual cartons on sale on suitable counters or coolers for direct sale to the consumer. The cartons for the eggs are manufactured by numerous carton fabricators and then shipped to the egg packager.

One extremely vexing problem that confronts the carton manufacturer is that each wholesale or retail outlet demands that his name, trademark and/or design be printed directly on the egg carton. In order to provide effective service for the wholesalers and retailers such as the large supermarkets existing throughout the country, the carton manufacturer must maintain on hand a tremendous variety of printing plates and other printnig equipment in order to take care of each customer.

In the packaging field today the consumer is demanding more and more that the contents of the packaged foods, etc., be subject to examination and inspection by the purchaser. Packaging food items in transparent or semitransparent packages is therefore ever increasing in importance. The same demand is present in the field of packaging eggs.

It is, therefore, one object of my invention to provide a novel and improved apparatus for applying a top cover to the carton.

Another object of my invention is to provide a novel and improved apparatus for heat sealing or otherwise fixing a transparent cover to a substantially open-top egg carton.

Yet, another object of my invention is to provide a novel and improved automatic apparatus for accomplishing the above objects.

A further object of my invention is to provide a novel and improved method for applying a top cover to a substantially open-top egg carton.

Another object of my invention is to provide a novel and improved method for applying a cover which may be transparent and flexible across the substantially open-top of a one piece egg carton.

Additional objects and advantages of my invention will become apparent from a study of the following description and drawings wherein:

FIG. 1 is a top plan view of my improved egg carton;
FIG. 2 is a side view of the carton shown in FIG. 1;
FIG. 3 is an end view of the carton shown in the above figures;
FIG. 4 is a section taken along lines 4—4 of FIG. 1;
FIG. 5 is a top view of the egg carton similar to FIG. 1 but with the transparent cover applied thereto to extend over the open-top portion of the egg carton;
FIG. 6 is a side view of FIG. 5;
FIG. 7 is a section taken along lines 7—7 of FIG. 5;
FIG. 7a is a detail of a portion of the carton depicting an embodiment of my invention;
FIG. 7b is a detail of a portion of the carton depicting another embodiment of my invention;
FIG. 8 is a top view of a preferred apparatus illustrating my invention;
FIG. 9 is a side view partially in section of the apparatus of FIG. 8;
FIGS. 10 through 12 are perspectives showing the progressive operation of the folding means for folding inwardly the side flaps of the egg carton;
FIGS. 13 through 15 are sections through an element which acts both as a separator between cartons being closed and as a means for folding inwardly the flaps at the carton ends;
FIG. 16 is a top view of the several parts shown in FIGS. 10 through 15;
FIG. 17 is a side view of FIG. 16;
FIG. 18 is a section taken along lines 18—18 of FIG. 17;
FIG. 19 is a section taken along lines 19—19 of FIG. 17;
FIG. 20 is a section taken along lines 20—20 of FIG. 9;
FIG. 21 is a section taken along lines 21—21 of FIG. 9;
FIG. 22 is a top view of the conveyor means and structure carried thereby which act as contacting and pusher elements for the cartons, separators for the cartons and as folding means for the end flaps of the carton;
FIG. 23 is a section taken along lines 23—23 of FIG. 20 illustrating a heat sealing device for affixing in place a heat-sealable cover, which may be transparent, for the open-top of the egg carton; and
FIG. 24 is a side view partially in section showing another form of heat sealing device.

*Egg Carton*

With reference to the drawing, the egg carton will now be described in detail. As seen in FIGS. 1 and 2 of the drawing, the egg carton generally indicated by letter A comprises side walls 1, end walls 3 and a bottom portion generally indicated by reference numeral 5. As seen more clearly in FIG. 4, the end and side walls are of such a height that they extend to at least the top end of eggs such as E when positioned within the carton A.

The carton A is preferably formed of a material which is capable of being molded as a single unit. Fiber pulp is generally satisfactory for use in forming my egg carton. Other suitable materials may be used, however, such as light strong plastic material which may be molded as a one piece unit.

The particular structure of the egg supporting elements of my carton will now be described.

As seen more clearly in FIG. 1, the egg supporting elements include a series of centrally disposed egg positioning posts 9 and peripherally disposed posts 9'. Preferably there are a total of three longitudinally extending lines of posts 9 and 9' which extend in substantially straight lines and spaced-apart manner from one end wall 3 to the opposite end wall 3 of the carton A. These posts 9 and 9' are also so disposed that they also form substantially straight lines in spaced-apart manner transversely of the carton.

As further seen in the drawing, the posts 9 disposed along the longitudinal center line are of a truncated cone shape with the wider portion of the post adjacent the bottom portion 5, while the posts 9' along and immediately adjacent the end and side walls assume the shape of a truncated vertically split cone with the curved surface thereof facing the carton interior with the wider portion of the posts adjacent the bottom portion 5. With this arrangement every two adjacent posts 9 disposed along the center line of the carton A, including the end posts 9' at the extreme ends of the line, cooperate with the opposite two adjacent posts 9' in both lines of posts 9' running along the side walls 1 and 3 to aid in supporting and positioning an egg therebetween in an endwise and upright position. The posts 9 and 9' are of the above mentioned shape so that, when the egg is packaged in its normally packaged position with the inwardly tapering or narrow end of the egg adjacent the bottom panel 5, the upwardly narrowing taper of the posts 9 and 9' will provide contacting support for the egg E as it extends upwardly to the top of the carton A.

In addition to the support provided by the posts 9 and 9', raised connecting ribs 11 serve to connect each adjacent post along the bottom post portions whereby a lower egg-seating pocket 13 is provided between every above mentioned set of egg supporting posts. Thus posts 9 and 9' and associated ribs 11 firmly support the eggs in position within the carton A.

Since the carton A is preferably formed of a single unit of molded material, the posts 9 which extend along the longitudinal center line of the carton A are therefore hollow and constitute upwardly projected portions of the bottom portion 5. The posts 9' which are positioned immediately adjacent the side and end walls 1 and 3 are formed of inwardly projected portions of the walls 1 and 3 as may be seen more clearly in FIGS. 2 and 3 of the drawing which show side and end views of the carton A from the exterior side of the carton.

FIG. 4 is a section taken along line 4—4 of FIG. 1 and shows in better detail the posts 9 and 9' as they are disposed within the carton A. The connecting ribs 11 are also seen in this figure. As further noted in FIG. 4, the posts 9 and 9' extend to a height which substantially corresponds to the height of the walls 1 and 3. This arrangement has been found to be entirely satisfactory, however, the height of the posts 9 which extend along the longitudinal center line of the carton A may terminate at a lower point as shown by the dotted line extending across the center posts 9 shown in FIG. 4. With the use of shorter posts along the longitudinal center of the carton A, the consumer can more easily grip the egg to remove it from the carton without interference from the posts.

The carton A also includes side flaps 16 and end flaps 18 as seen in FIGS. 1 through 5 and 7. These flaps, when folded inwardly, provide an attaching support for a top cover of the carton as well as protection for the contents and stiffening means along the top edge of the carton. The flaps 16 and 18 are folded inwardly towards the carton interior until they rest upon the tops of the posts 9' peripherally disposed along the side and end walls 1 and 3 of the carton A. The posts which are of substantially the same height as the walls of the carton A limit the inward folding of the flaps to a position substantially at right angles to the walls of the carton. FIGS. 1 through 4 show the position of the flaps 16 and 18 before they are folded inwardly and FIGS. 5–7 show the side and end flaps 16 and 18 in their inwardly folded position resting upon the tops of the peripherally disposed posts 9'.

FIGS. 5 through 7 show the carton A with the top cover 20 in position after being applied to the carton A. As seen therein, the top cover 20 comprises a thin sheet which is fixed in position on the carton A by adhering the top cover 20 to the upper surface of the inwardly folded side and end flaps 16 and 18 and, if desired, around the ridge 31 as shown more clearly in FIG. 7. As seen more clearly in FIGS. 5 and 6, the top cover 20 extends for a distance beyond one end of the carton to provide a pull tab 22 whereby the top cover 20 may be easily removed from the carton by gripping the pull tab 22 and pulling the top cover 20 back along the body portion A.

The top cover 20 is preferably formed of a heat-sealable thin flexible sheet or film which may be applied to the carton by means of a heat seal. However, the top cover may be applied by the use of suitable adhesives when other than heat-sealable material is used for the top cover.

As mentioned above, it is desirable in the packaging field to provide a packaged article or articles wherein the purchaser may observe the contents within the container. It is therefore preferable in the present invention to use a transparent cover 20 whereby the carton contents may be easily observed. There are numerous transparent flexible films on the market today which may be used for this purpose. These films may be a thermoplastic (heat sealable) or nonthermoplastic nature. Among these films cellophane having a heat sealing coating is very satisfactory.

On the other hand, it is within the contemplation of the present invention to use a snap-on type cover which may easily be applied to the carton A. The snap-on cover 25 is shown more clearly in FIG. 7a and consists generally of a transparent substantially stiff plastic sheet. The cover has a depending skirt 27 and an outwardly extending edge portion 29 formed as integral parts of the cover. The edge portion 29 of the snap-on cover 25 is forced down over a small ridge 31 which extends along the fold line of the flaps and is inherently formed when the border flaps 16 and 18 are folded inwardly towards the carton interior. This snap-on top cover 25 may be formed of numerous suitable plastic sheet material such as cellulose acetate.

A further top cover arrangement is also contemplated by this invention and is shown in FIG. 7b. Here, the edges of the top cover 20 extend downwardly along the upper portions of sides 1 and ends 3 of the carton. These edges of the cover are adhered to those portions of the carton. A pull tab length like 22 of FIGS. 5 and 6 may also be employed to permit the consumer to easily remove the top cover.

Transparent tops 20 and 25 may advantageously have printed matter applied thereto. The printed matter may be in the form of a design, trademark or name and is applied to the transparent cover by suitable printing means well known to the trade.

*Apparatus and Method*

The preferred apparatus for automatically folding inwardly the side and end flaps 16 and 18 of the cartons A with eggs positioned therein and for applying the top cover to the carton A will now be described.

As seen in FIGS. 8 and 9, there is provided an elongated main support stand 50. Mounted on the top of the stand 50 and extending for the length of the stand is a track 52 along which the cartons A travel. The cross-section of the track 52 is shown in detail in FIGS. 18 and 19 of the drawing. As seen therein, the track 52 includes a trough portion 54 for a purpose which will be later described. The remaining portion of the track 52 consists of laterally extending portions 56 which extend outwardly from the top portions of the sides of the trough 54 to provide support for the cartons traveling therealong.

To move the cartons A along the track 52, means, preferably in the form of a chain 58 (FIGS. 9, 17–23), is driven so that it travels along and in the trough 54. As seen more clearly in FIG. 9, the chain 58 is supported on suitable sprockets 60 and 61 supported on sprocket shafts 60' and 61' respectively which are mounted upon the stand below the track 52 at opposite ends of the stand 50. The sprocket 60 is driven in intermittent manner whereby the chain 58 travels intermittently along the trough 54.

FIGS. 8 and 9 show the drive arrangement for the sprocket 60 and its associated chain 58. As seen in FIG. 8, a motor M supports a drive gear 63 which in turn meshes with gear 65 to rotate shaft 67 carrying disc 69. A drive pin 71 is mounted on the inner face of the disc 69 adjacent the periphery thereof and cooperates with open end slots 73 formed in a disc 73' fixed to shaft 60'. As seen in FIG. 9, the disc 69 rotates in a clockwise direction whereby the pin 71 will enter the slot 73 as shown in the drawing. The pin 71 through its cooperation with slot 73 of disc 73' and shaft 60' drives the sprocket 60 in a counterclockwise direction until the pin slides out of the slot 73. The disc 69 continues its rotation and the sprocket 60 remains stationary until the pin 71 is rotated to a position at which it enters another slot 73. With this above described drive arrangement, the sprocket 60 and supported chain 58 are intermittently driven whereby the chain 58 travels in intermittent manner along the track 52.

Supported at spaced-apart points along the chain as seen in FIG. 9 are carton pushers 80 which also act as carton separators. The carton pushers 80 contact the trailing ends 3 of the body portions A to move them along the track 52 with the same intermittent rate of travel as that of the chain 58. The structure of the carton pushers 80 is shown in greater detail in FIGS. 13 through 15, 18 and 19. As seen therein, the carton pusher 80 comprises a pair of spaced-apart fixed plates 82 which support, between them, a vertically slidable plate 84. Slidable plate 84 has elongated vertically extending slots 86 (see FIGS. 18 and 19) whereby the sldable plate 84 is supported in position between the fixed plates 82 with the use of pin members 88.

To firmly anchor the pushers 80 to the chain 58 so that the pushers will not wobble as they travel along the track 52, a laterally extending platform 90 (see FIGS. 18 and 19) having downwardly extending elements 91 is secured to the links of the chain 58 by chain pin members 92. As seen more clearly in FIGS. 13 through 15, each fixed plate 82 has a laterally extending foot plate 94 which member is secured to the platform 90 by retaining members 96 shown in FIGS. 18 and 19.

With this arrangement described above, the vertically slidable plates 84 are capable of being raised or lowered with respect to the fixed plates 82 for a purpose which will be hereinafter described.

A carton feed assembly 99 is shown in FIG. 9 for feeding the cartons to the track 52. As seen therein, the cartons ride on a conveyor belt 101 which continuously urges the cartons A toward the track 52. Conveyor belt 101 travels at a faster rate of speed than the chain 58. A carton brake 103 prevents indiscriminate feeding of the cartons A to the track 52. As shown in FIG. 9, the brake 103 is in braking position thus preventing forward travel of the carton A. A brake release member 105 which forms an integral part of the brake 103 lies in the path of the carton pushers 80 as they come into position around the sprocket 60 for travel along the track 52. As each pusher 80 contacts the brake release 105, it urges the release 103 upwardly thus releasing the brake and permits a carton A to travel under the brake and onto the track 52. As mentioned above, the conveyor belt 101 of the carton feeding assembly 99 travels at a faster rate of speed than the chain 58 whereby the carton A is propelled across the gap between the carton feeding assembly 99 and the entrance point of the track 52. The roller assembly 110 secured to the carton feeding assembly 99 and overlying the path assumed by the carton as it moves from the feeding assembly to the track 52 both guides and prevents the carton A from moving upwardly out of its path as the carton is propelled toward the track 52.

As noted from the above description of the egg carton, the carton has side flaps 16 and end flaps 18 which extend from the top portions of the carton A. As also seen from the above description, these flaps must be folded inwardly toward the interior of the carton to a point where they rest upon the tops of the egg supporting posts 9' located around the periphery of the carton interior. When these flaps are so folded and supported by the posts 9', they provide suitable surfaces for supporting a top cover 20 for the carton A.

For folding the side flaps 16 inwardly, there are provided a pair of flap folders 115 (FIG. 9) which are supported in stationary manner on the stand 50 at a point near the entrance end and on opposite sides of the track 52. As seen in FIG. 9, folded flap retainers 117 are supported on flap folders 115 so that they extend above the track substantially in alignment with the top portion of the moving cartons A. As seen more clearly in FIGS. 10 through 12 and 16, the folded flap retainers 117 are bent inwardly toward the center of the track 52.

The operation of the side flap folding means is shown in successive manner in FIGS. 10 through 12. As the carton moves between the flap folders 115, the outer surfaces of the side flaps 16 initiate contact with the aft portions of flap folders 115, the flaps are urged inwardly in gradual manner by the progressive pressure exterted there against and until they ride under folded flap retainers 117 and are folded over into contact with the peripherally disposed posts 9'. The side flaps 16 are held in their folded position as long as the top of the flaps remain in contact with retainers 117.

After the carton A passes beyond finger folders 115, the side flaps 16, in addition to the end flaps 18 as will be explained later, are maintained in their folded position by a flap position retainer 120 which lies downstream of the folding fingers 115 and which receives the cartons A before they completely pass beyond the finger folders 115. The folded flap position retainer 120 comprises a plate 120' secured to posts 122 and 123 which are in turn secured in fixed manner to the stand 50 (see FIGS. 9 and 16) so that the plate 120' lies in a lateral plane a spaced distance above the track 52. The top of the carton A barely clears the under surface of the plate 120' as it passes through the fold flap position retainer 120. The plate 120' thereby maintains the side and end flaps in their folded position.

The end flap folding mechanism will now be described in detail. For folding the end flaps 18 of the carton A inwardly toward the carton interior whereby the flaps rest upon the tops of an egg supporting post 9', a spring loaded, pivotable flap folding finger 130 is mounted in off-center manner to the top of the vertical slidable plate 84 of each carton pusher 80. As seen in FIG. 18, retaining member 132 pivotably connects the finger 130 to the vertical slidable plate 84 in a spring loaded manner. Generally, the slidable plate 84 rides along the track in its lowered position as shown in FIG. 18. When in this position, the folding finger 130 is in its inoperative position. To elevate the plate 84 to a position wherein the folding finger 130 may be pivoted to fold the end flaps 18, elevating plates 135 are mounted on the stand 50 in direct opposed relationship on each side of the track at a point between the flap folding retainers 117 and the folded flap position retainer 120. The elevating plates 135 have gradually ascending surfaces. The vertical slidable plate 84 has laterally extending ears 137 which extend outwardly to a point where they will come into contact with the elevating plates 135 as the carton moves along the track 52. As the pusher 80 initiates contact with the elevating plates 135, the ears 137 of the elevatable plate ride along and upwardly over the gradual ascending edges of the elevating plates 135 until the slidable plate 84 is in the position shown in FIGS. 12 and 19. As the plate 84 is elevated, it urges the trailing end flap 18 of a forward carton and the leading end flap 18 of a following carton into vertical position from an outwardly extended position as shown in FIGS. 13 and 14.

To pivot the folding finger 130, actuating means 140 is supported on the flap position retainer 120 at the carton entrance end (see FIGS. 9 and 16) of the retainer. The actuator means 140 extends beyond the end of the folded flap position retainer 120 so that it actuates the pivotable finger 130 before the pusher 80 carrying the finger enters the flap position retainer 120. Preferably the actuator 140 comprises a roller cam 142 which is mounted in such a manner that the cam is rotatable about a vertical axis.

As the pusher 80 moves toward the actuator 140, the short end of the finger 130 comes in contact with the actuator and as the pusher further travels along the track 52, the arm is urged out of its normal position by the roller 142 to a position shown in FIGS. 15 and 16.

As the finger 130 is swung out of position in the above manner, the longer end of the finger contacts the trailing end flap 18 of a forward carton A as shown in FIGS. 15 and 16 while the shorter end of the finger 130 contacts the leading end flap 18 of a trailing carton A. As the finger is further moved out of position, the ends thereof urge the two end flaps inwardly and against the egg support posts 9' located along the periphery of the end walls of the carton interiors. The finger 130 holds both end flaps 18 of both cartons in their folded position until the leading end flap 18 of the trailing carton A passes into the folded flap position retainer 120. At this point, the finger 130 slides off of the roller cam 142 and returns to its normal position and at the same time the ears 137 of the vertical slidable plate 84 pass beyond the ends of the elevating plates 135 whereby the slidable plate drops to its lower position and continues its travel along the track 52.

The top cover is then applied to the carton A as it emerges from the flap position retainer 120. As seen in FIGS. 9, 17 and 23, a supply roll of flexible heat-sealable material 20 is supported on a shaft 162 which is in turn supported on suitable posts 164 secured to the stand 50. The sheet material 20 is then drawn through guide members 167 and 168 and under roller 169. The sheet material 20 is then fed directly upon the side and end flaps 116 and 118 of the carton A for the length thereof as it emerges from the folded flap position retainer 120.

The drawing force for drawing the sheet material 20 onto the carton A is provided by a forward carton to which the sheet material has already been permanently applied.

After the carton A to which the sheet material is being applied is moved along the track to a position completely free of the flap position retainer 120, the sheet material 20 is heat sealed to the top surface of the inwardly folded flaps 16 and 18. The heat sealing is preferably accomplished by heat sealing mechanism generally designated as 180 and shown in FIGS. 9, 20, 21 and 23 of the drawing. The heat sealing mechanism comprises a platen 182 which includes means for heating the platen. The platen 182 is supported by a shaft 183 which is vertically reciprocable in a suitable frame assembly 184 (see FIG. 20). The platen 182 itself is attached in depending manner to the frame 184 by spring members 188 to normally urge the platen toward the frame assembly 184. The platen is brought to its lowered or sealing position against the end and side flaps of the carton A by means of a lever assembly 190 connected with the frame assembly support 185 and the shaft 183. As seen in FIG. 20, an elongated slot 192 in the lever assembly 190 permits the lever and shaft 183 to be raised and lowered. To operate the lever assembly 190, the free end of the lever assembly is secured to a rod 196 which is secured at its opposite end within a rotary cam unit 198 (see FIG. 9). The rod 196 rides within a suitable eccentric cam track 200 of the cam casing 198 whereby the rod and attached lever assembly 190 in addition to the shaft 183 and the heated platen 182 is raised or lowered as the cam unit is rotated. The cam track 200 is of such a design and is so timed that the platen 182 is lowered against the sheet material 20 for a predetermined time adequate to cause the desired heat sealing. This heat sealing occurs during a dwell period of the motion of chain 58.

The drive mechanism for rotating the cam unit 198 is shown in FIG. 8. The rotary cam unit 198 is mounted on a drive shaft 202 which is driven through meshing gears 204 and 206, the latter gear being mounted on a driven shaft 208 which is in turn driven through beveled gears 210 which are driven by means previously described.

As further seen in FIG. 23, a knife or cutting edge 215 is secured to the platen 182 whereby every time the platen is lowered against the sheet material 20 and supporting carton A the knife 215 severs the sheet material 20 at a point between the immediate carton being sealed and a forward carton which has had the cover seal applied thereto. The knife 215 preferably extends outwardly from the platen to such an extent that a pull tab 22 described heretofore is provided whereby the top cover may be easily removed from the carton A.

The embodiment of the heat sealing mechanism shown in FIG. 24 is suitable for applying a wider sheet material 20 as a cover for the carton A in the manner illustrated in FIG. 7b. Upwardly extending socket 224 of heating platen 225 is supported on shaft 227 by a pin 234 fixed in socket 224 at one end and slidably received in slot 234' of shaft 227. A member 229 having side and end walls 231 connected thereto through spring loaded pivot assemblies 233 is supported above socket 224 and on shaft 227 by pin 235 which extends through the member 229 and the shaft 227. Socket 224 and member 229 are normally retained in spaced apart position by spring member 236 extending around shaft 227.

In operation, shaft 227, member 229 and platen 225 are lowered as a unit to present the platen 225 against the top cover heat-sealable material 20 and carton A to seal the material to the upper surfaces of the end and side flaps 16 and 18 of the carton A. Upon continued downward movement of the shaft 227, the spring 236 is compressed whereby the side and end walls 231 and member 229 descend downwardly over the sides and ends of the carton A. Spring loaded pivot assemblies 233 allow for variation of the carton A dimensions while forcing side and end walls 231 against the side and end walls 1 and 3 of the carton A. Side and end walls 231 are heated through heating units 231' housed therein for the purpose of adhering the heat-sealable material 20 to the side and end walls of carton A. The compressibility of spring 236 determines the degree of pressure applied to the top of carton A and proper selection thereof prevents undue pressure on the carton while allowing heat-sealing along the sides and ends thereof. The control mechanism for raising and lowering the platen 225 and member 229 is preferably the same as that described in connection with FIG. 20 hereof.

After the sheet material 20 has been heat sealed to the carton A and cut by knife 215 the carton reaches the end of the track 52 and is discharged onto a carton discharge station assembly 240 (FIG. 9) supported opposite the end of the track 52. The cartons A pass directly onto continuous conveyor belt 242 of the carton discharge assembly 240. The roller assembly 244 maintains the carton in its desired path of travel as the carton is being transferred from the track 52 to the carton discharge assembly 240.

This application is a divisional application of application Serial No. 837,510 as filed September 1, 1959, and now abandoned.

Obviously many modifications and variations of the present invention are possible in the light of the above teachings. It is, therefore, to be understood that within the scope of the appended claims the invention may be practiced otherwise than as specifically described.

What is claimed is:

1. Apparatus for closing walled cartons having inwardly foldable flap structure extending laterally outwardly from the top portion of at least one wall thereof, said apparatus comprising means for arranging at least two cartons in spaced apart relation in a row with the flap structure of each in opposition, flap closure means positioned for insertion in the open space between the opposing walls and below the flap structure of said two cartons, and actuating means connected to move said closure means upwardly from said inserted position to lift the opposing flap structure, and to then move said flap closure means to a position in which a portion of the flap closure means pushes one flap structure over the top of its carton and another portion of the flap closure means pushes the opposing flap structure over the top of the opposing carton, and means for moving said spaced apart cartons with respect to the actuating means and thereby operating said actuating means.

2. The combination of claim 1 in which the flap closure means include an arm eccentrically pivoted for movement around a vertical axis to push the flap structures over the tops of the cartons, the longer portion of the arm being the portion that pushes the trailing flap structure of the moving cartons and the shorter portion of the arm being the portion that pushes the opposing flap structure over the top of the other carton.

References Cited in the file of this patent

UNITED STATES PATENTS

| | | |
|---|---|---|
| 1,468,333 | Thom | Sept. 18, 1923 |
| 1,478,836 | Peters et al. | Dec. 25, 1923 |
| 1,883,449 | Andrews | Oct. 8, 1932 |
| 2,291,280 | Joplin | July 28, 1942 |
| 2,649,221 | Wagner et al. | Aug. 18, 1953 |
| 2,756,553 | Ferguson et al. | July 31, 1956 |
| 3,029,569 | Taylor | Apr. 17, 1962 |